Aug. 11, 1959 P. L. GOMORY 2,899,374
METHODS AND APPARATUS FOR HANDLING PARTICULATE SOLIDS
Filed March 6, 1956
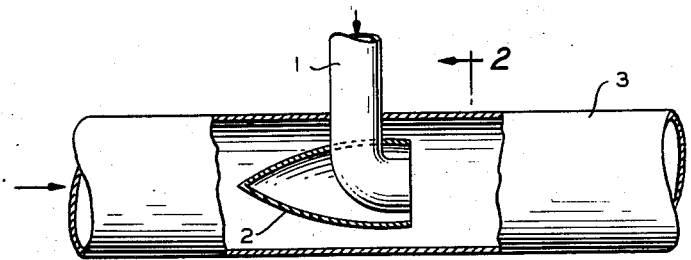
FIG. 1.
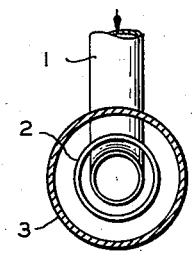
FIG. 2.
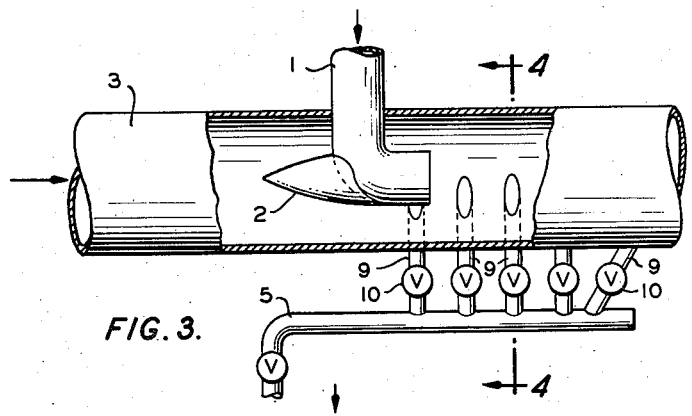
FIG. 3.
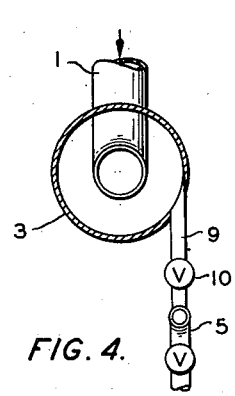
FIG. 4.
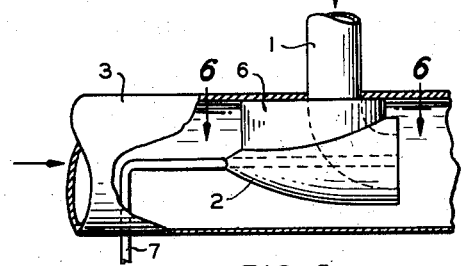
FIG. 5.
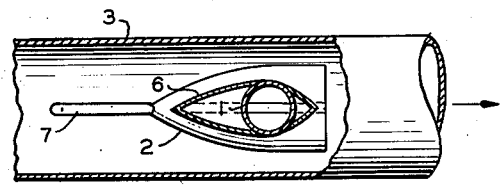
FIG. 6.
FIG. 8.
FIG. 7.
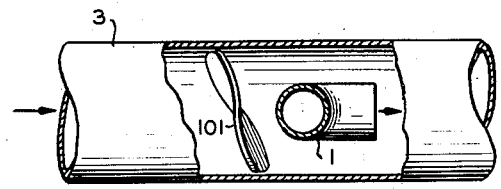
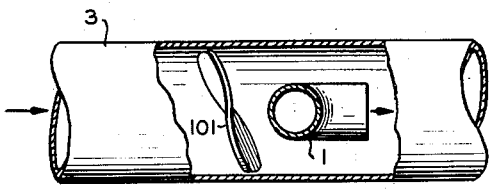
INVENTOR.
P. L. GOMORY
BY
Hudson & Young
ATTORNEYS 2,899,374

METHODS AND APPARATUS FOR HANDLING PARTICULATE SOLIDS

Paul L. Gomory, Bethesda, Md., assignor to Phillips Petroleum Company, a corporation of Delaware Application March 6, 1956, Serial No. 569,760

10 Claims. (Cl. 208—47)

The present invention is directed to methods and to apparatus for handling particulate solid materials. In one aspect the invention relates to conveying or transporting of particulate solids from one point to another in a confined stream as a suspension in a fluid. In another aspect the invention relates to a method and to apparatus for such transporting wherein the particulate solid is a catalytic material.

It has been found that, when a stream of particulate solids is introduced into a confined flowing stream of fluid for suspension therein and transportation of the combined stream, at some point shortly after the confluence of the two streams, a definite area or locus of maximum erosion of the conduit confining the combined streams will occur at any given conditions or quantities of flow of the two streams. Thus, the conduit must be repaired or replaced when its wall at said locus is eroded through or has become dangerously worn. Further, it has been found that the attrition of the catalyst itself is a problem.

It is an object of this invention to provide methods and apparatus for handling particulate solids. It is another object of this invention to provide methods and apparatus to prolong the useful life of a conduit employed in transporting particulate solids. It is another object to minimize the erosion of a conduit employed in transporting particulate solids. It is a still further object to minimize the attrition of solids that usually occurs when a stream of particulate solids is introduced into a confined flowing stream of fluid for suspension of the solids and transportation of the combined stream.

In one aspect the invention relates to a method and to apparatus for prolonging the life of the conduit employed in handling particulate solids, which method comprises introducing said particulate solids substantially concentrically into an annulus of flowing, transporting or conveying fluid at the point of area of confluence of the two flowing streams. In another aspect maintenance of the annulus of flowing, rotating fluid and further minimization of erosion of the conduit surrounding the annulus and further minimization of the attrition of particulate solids being transported is effected by adjusting the velocities of flow of the annular transporting fluid and the central stream of particulate solids in the direction of overall mass flow such that the said velocities are substantially equal, or the relative rates of flow are at least within the limits from 1.5 to 1 and 1 to 1.5. In one aspect this result is accomplished by providing an enlargement, preferably streamlined, in the main conveying conduit in an area which includes the point of confluence of the transporting fluid stream and the particulate solids stream. In one aspect this annulus of flowing fluid is produced by placing a baffle having a substantially cylindrical cross-section in the path of the flowing fluid stream in the area of confluence of the fluid and solid streams and introducing the stream of particulate solids substantially concentrically into the downstream open end of said baffle. This baffle can be a streamlined member, such as a generally bullet-shaped baffle, or it can be a cylindrical portion of a conduit which introduces the solids stream into the stream of conveying fluid. In another aspect of the invention, additional flowing fluid is introduced at one or more points in the area of confluence of the fluid and particulate solids streams tangentially to the said annular flowing fluid stream, and assists in forming and/or maintaining the annulus. In other aspects the invention relates to apparatus for effecting these methods.

Other aspects and objects, as well as advantages of the invention are apparent from this disclosure, the drawings, and the claims.

In one particular service in which problems discussed herein are particularly troublesome, i.e., in the so-called fluidized catalytic cracking of hydrocarbons, large quantities of finely divided solid catalyst materials are required to be handled. In such processes these materials are transported or conveyed from point to point in the system by injection and dispersion of the particulate solids into a flowing stream of fluid. By varying the density of the suspension of solids in the fluid material, differential pressures are obtained which aid in movement of the solid materials through the system. For example, a mass of finely divided solid material having a density of from about 25 to 50 pounds per cubic foot may be passed into a stream of fluid flowing through another conduit under a pressure of from about 10 to 25 pounds per square inch to form a suspension of catalytic material therein having a density of from about 1 to 1½ pounds per cubic foot. Under such conditions introduction of the powdered solid material can be accomplished by a gravity flow of a confined stream of the particulate solid material into a conduit through which is passed a stream of fluid material. As before noted, it has been found that at or near the confluence or juncture of the two streams in said conduit, a locus of maximum erosion occurs in said conduit, and further that erosion of said conduit and attrition of said particulate solids is minimized by producing an annulus of transporting fluid in the area of juncture of the solids and fluid streams.

According to my invention there is provided, in a process which comprises passing a confined fluid stream of carrier fluid from a first point to a second point and introducing a confined stream of particulate solids into confluence with said fluid stream at a point intermediate said first and second points, the method which comprises introducing said stream of particulate solids substantially concentrically into a flowing annular portion of said confined fluid stream, and thereafter allowing said fluid stream and said solids stream to gradually diffuse one into the other during flow to said second point.

Also, according to my invention there is provided, in a process which comprises passing a confined fluid stream of carrier fluid from a first point to a second point and introducing a confined stream of particulate solids into confluence with said fluid stream at a point intermediate said first and second points, the method which comprises introducing said stream of particulate solids substantially concentrically into a flowing annular portion of said confined fluid stream, and thereafter allowing said fluid stream and said solids stream to gradually diffuse one into the other during flow to said second point, the relative velocities of flow of said flowing annular portion to said stream of particulate solids in the direction of overall mass flow at said point of confluence being in the range from 1.5:1 to 1:1.5, preferably substantially 1:1.

According to one form of my invention this flowing annular portion of the confined fluid stream is produced by a substantially concentrically located baffle having a substantially cylindrical cross-section, streamlined or substantially bullet-shaped and substantially concentric with the end of the conduit through which the particulate solids are introduced into the annular stream.

Also, according to the invention, in connection with the foregoing embodiments of the invention, one or more streams of supplemental carrier fluid can be introduced tangentially to the confined fluid stream of carrier fluid in order to assist in forming and/or maintaining the flowing annulus and aid in the diffusion of the solids while keeping them away from the periphery of the stream insofar as possible. This introduction of tangential fluid is effected at or near the point of confluence of the main carrier fluid and the said solid stream.

Certain other features of the process and apparatus are described hereinafter, especially in connection with the description of Figures 1 to 7.

Figures 1 and 2 represent one form of apparatus in which the invention can be practiced. Figures 3 and 4 represent another form of apparatus by which the invention can be practiced. Figures 5 and 6 represent still another form of apparatus in which the invention can be practiced. Like numerals designate like parts in the various figures. For the sake of simplicity, the operation of the figures will be described in terms of an operation practiced in a fluidized catalytic cracking unit, wherein the particulate solids stream is spent catalyst from a reaction zone and the carrier fluid is air. However, it is to be understood that the process is applicable when using any particulate solid and any carrier fluid. Figure 7 represents a modification of Figure 1. Figure 8 is another modification of my invention depicting a plan view, partly broken away, showing a fluid deflector device employed to impart rotational motion to the fluid.

Specifically, referring to Figures 1 and 2, conduit 1 conducts a steam-stripped, spent particulate solid catalyst in a dense phase to conveying conduit 3 by means of the elbow-shaped outlet at the end of conduit 1, which outlet opens in a downstream direction substantially concentrically of conduit 3 and streamlining element 2, such as the bullet-shaped baffle illustrated. The conveying fluid, air, is introduced into the upstream end of conduit 3. The streamlining element 2 is suitably mounted on the outlet of conduit 1. The open or downstream end of element 2 terminates at the outlet end of conduit 1, as shown, or shortly upstream thereof, thus minimizing erosion of the end of streamlining baffle element 2 itself.

The air is caused to flow over the baffle 2. The air thus forms a hollow cylinder or annular flowing portion, along the inner periphery of conduit 3 at the locus, and for a short distance downstream thereof, where the solids and carrier fluid, air, contact one another. Catalyst issues from the outlet of conduit 1 concentrically into the annular flowing portion of air immediately downstream from the conduit 1 outlet. During the subsequent flow downstream of the solids and air, the solids stream and air stream gradually diffuse one into the other. The net effect of introducting the particulate solids into conduit 3 in this manner is to minimize the area of high erosion which normally occurs at a point downstream of, but close to, the point of confluence of the solids and carrier fluid streams, and the annular portion of the air stream flowing in conduit 3 minimizes the amount of solids reaching and impinging on the inner walls of the conduit, spreads the erosive action which still remains over a wider downstream area of conduit 3, and minimizes attrition of the catalyst itself by minimizing the turbulence of the flow usually caused by the flowing together or confluence of flowing solids and fluid streams.

The operation of Figures 5 and 6 is as described for Figures 1 and 2 except that streamlining fin 6 is provided and surrounds the portion of conduit 1 which is in the path of flow of air in conduit 3 in order to minimize turbulence and eddy currents. The other modification illustrated in Figures 5 and 6 is conduit 7 which conducts additional carrier fluid, which can be air also, into the solids in conduit 1 near the outlet end thereof in a direction concurrent with the flow thereof. This feature can be employed, if desired, in order minimize turbulence in the area where the annular stream of air and the central core of flowing solids first meet. Thus, the addition of fluid through conduit 7 can be employed to adjust the ratio of velocity of the particulate solids stream in the direction of mass flow with respect to the velocity of flow of the annular stream of carrier fluid.

In Figures 3 and 4 the formation and maintenance of the annular flowing stream of air is assisted by injecting one or more streams of supplemental carrier fluid tangentially into conduit 3 through conduit 5 and one or more branch conduits 9, three such branch lines being here shown. The tangentially injected fluid causes an annular rotating stream of carrier fluid to be formed immediately downstream from the outlet of conduit 1. If desired, this feature can be used also in the apparatus and process of Figures 1 and 2 and in the apparatus and process of Figures 5 and 6. In the embodiment of the invention wherein a tangential fluid is injected, as in Figures 3 and 4, the injected fluid may be a portion of the carrier fluid flowing in conduit 3, obtained from an upstream portion of conduit 3, or from an extraneous source, of it may be an entirely extraneous fluid, liquid or vapor, different from the main carrier fluid. For instance, in the methods described above wherein spent particulate catalyst is transported in a carrier air stream, the tangential fluid can be diluting steam. Preferably when the tangential fluid is a liquid, it is a vaporizable liquid which will form a film on the wall which will gradually vaporize during the flow; for instance, in a method of transporting a regenerated particulate solid catalyst, using a vaporized hydrocarbon feed flowing in line 3 as the carrier fluid, the tangentially injected fluid can be a portion of the hydrocarbon carrier fluid in a liquid state. In such a process the combined regenerated catalyst and feed hydrocarbon, used as carrier fluid in this embodiment, is normally then flowed downstream to the hydrocarbon conversion zone in accordance with known practice.

All or any one or more of the branch conduits 9 can be employed at a time in order to obtain best and smoothest confluence of the transporting fluid and the solids. Thus, if a node-like disturbance is found to be set up due to irregularities of the inside of conduits 1 or 3, then a particular tangential entry can be used to inject a little more or less gas by adjustment of its respective valve 10. The tangential entries can be perpendicularly tangent to conduit 3, or can be at an angle and tangent as shown with respect to the line 9 which is farthest downstream along conduit 3. When catalytically cracking a readily cokable oil and using the apparatus of the invention to transfer hot catalyst to the catalytic cracking zone, it is a feature of the invention that a portion of the readily cokable oil, usually vaporized, can be injected tangentially as in Figures 3 and 4. Upon injection some cracking will occur and some coke or carbonaceous material will be laid down on the inside walls of conduit 3; this coke will be continually scraped off the wall by catalyst particles, to the extent that some catalyst will migrate or diffuse to the periphery of the pipe. Also, it will be noted that the layer of coke will protect the walls from erosion by such catalyst particles that do migrate toward the walls. The operation of Figure 7 is as described for Figures 1 and 2, but the apparatus of Figure 7 is modified so that there is a streamlined enlargement 8 of conduit 3 in the main conveying conduit over a substantial length thereof in an area which includes the point of confluence in the operation of the apparatus between the stream emerging from the end of conduit 1 and the annular stream of transporting fluid flowing through conduit 3.

Figure 8 shows streamlined deflector device 101 situated in the upper portion of conduit 3, upstream of solids entry line 1. Fluid entering, e.g., air, is given a swirling motion as it is acted upon by deflector 101, effecting an annulus or cylinder of fluid on the downstream side of 101 in pipe 3. This modification does not necessarily require tangential fluid introduction to pipe 3.

EXAMPLE

In a conventional dense bed down-flow type catalytic cracking system of the general type shown, for instance, in Petroleum Refiner, volume 31, No. 9 (September 1952), page 302, a hydrocarbon oil is cracked catalytically. In such a process the apparatus of the present invention is employed in a substantially horizontal portion of the spent catalyst carrier line, i.e., the line transferring spent catalyst from the reactor to the regenerator. The catalyst employed is a natural catalyst which is an acid-treated bentonite consisting primarily of silica alumina clay of the montmorillonite type. It has a United States standard sieve size of 90 to 400 mesh. The feed stock being catalytically cracked in this example is a mixture of virgin gas oils, i.e., a mixture of gas oil from thermally topping Western Kansas crude plus heavy gas oil recovered from vacuum distillation of the topped crude. The mixed gas oil has a boiling range of from 400 to 1000° F. The temperature of the oil feed to the reactor riser is about 700° F. The conditions in the reactor and regenerator are given in Table I. The conditions existing in the downcomer, carrying catalyst from the reactor, i.e., conduit 1 in Figure 3, are shown in Table II. The conditions in the transfer line 3 of Figure 3, i.e., the carrier or transfer line through which catalyst is transferred to the regenerator, are shown in Table III. Table III represents conditions in the transfer line at a distance downstream from the point of juncture of conduits 1 and 3 such that there has been substantially complete mixing of the catalyst and fluid streams. The primary air is the air introduced into the upstream end of conduit 3 of Figure 3, and the secondary air is the total air introduced through conduits 9 of Figure 3. Under the conditions shown, except using no secondary air through the conduits 9 and also eliminating the extension of conduit 1 into conduit 3 and the streamlined baffle 2, as in conventional operation, there is a definite area of maximum erosion beginning immediately in conduit 3 downstream from the intersection of conduit 1 therewith. This erosion tends to follow a spiral path from the upper side of conduit 3 to the lower side. Turbulence of the streams in this area also causes an undesirably high amount of catalyst attrition and consequent later loss of catalyst as fines, as will be understood by those skilled in the art. When operating as in the present example, using the apparatus of Figure 3 and keeping open each of the first four valves 10 in the respective lines 9, the rate of entry of secondary air is about 50 feet per second, each of the lines 9 being about 8.5 inches in diameter. When operating according to this example according to the invention, the total erosion in conduit 3 is lessened and the erosion that does occur is spread out over a wider area, thus extending the useful life of the conduit 3; also, catalyst attrition is minimized.

Table I

Reactor:
Pressure, p.s.i.g. _____ 12
Temperature, ° F. _____ 900
Catalyst/oil wt. ratio _____ 5:1
Wt. of oil per hour/wt. catalyst in reactor ___ 6:1
Regenerator:
Pressure, p.s.i.g. _____ 7
Temperature, ° F. _____ 1050
Catalyst residence time, min.[1] _____ 12

[1] Catalyst residence time is calculated from weight of catalyst in regenerator divided by weight of catalyst circulated per minute.

Table II

Spent catalyst pickup, downcomer:
Circulation, tons/minute _____ 20
Diameter of downcomer _____ 3'6"
Temperature, ° F. _____ 900
Catalyst density, lbs./cu. ft. _____ 33
Catalyst velocity at outlet, ft./sec. _____ 2

Table III

Transfer line:
Temperature, ° F. _____ 910
Pressure, p.s.i.g. _____ 18
Catalyst density, lbs./cu. ft. _____ 0.9
Superficial air velocity, ft./sec.[1] _____ 29
Primary air, s.c.f. min.[2] _____ 35,000
Secondary air, s.c.f./s.c.f. prim. _____ 0.15
Air, or s.c.f./minute[2] _____ 5,000

[1] As if pipe were empty on 5'6" pipe and 910° F. at 18 p.s.i.g.
[2] Air streams enter at 80° F., but of course heat up near and in the transfer line.

As will be evident to those skilled in the art, various modifications of this invention can be made or followed in the light of the foregoing disclosure and discussion without departing from the spirit or scope of the disclosure or from the scope of the claims.

I claim:
1. In a process which comprises passing a confined fluid stream of carrier fluid from a first point to a second point and introducing a confined stream of particulate solids into confluence with said fluid stream at a point intermediate said first and second points, the method which comprises introducing said stream of particulate solids substantially concentrically into a flowing annular portion of said confined fluid stream, introducing a plurality of streams of secondary fluid tangentially to said flowing stream of carrier fluid near said point of confluence, each of said plurality of streams being introduced at spaced intervals along the line of flow of said flowing stream of carrier fluid, the flow rate of each of said plurality of streams being adjusted individually in order to aid in obtaining a smooth confluence of said flowing stream of carrier fluid and said stream of particulate solids and to aid in minimizing migration of particulate solids to the periphery of said flowing stream of carrier fluid, said carrier fluid being a hydrocarbon to be catalytically cracked, said particulate solids stream being a stream of hot fluidizable particulate cracking catalyst and said secondary fluid being a readily cokable oil to be subsequently catalytically cracked, wherein upon injection of said readily cokable oil some cracking occurs resulting in the formation of carbonaceous material, at least a portion of which adheres to inside walls of a conduit confining said carrier fluid near said point of confluence and wherein said carbonaceous material which adheres to said walls protects said walls from excessive abrasion.

2. In a process which comprises passing a confined fluid stream of carrier fluid from a first point to a second point and introducing a confined stream of particulate solids into confluence with said fluid stream at a point intermediate said first and second points, the method which comprises introducing said stream of particulate solids substantially concentrically into a flowing annular portion of said confined fluid stream, introducing at least one stream of a readily cokable oil tangentially to said stream of carrier fluid near said point of confluence, at least some cracking of said cokable oil occurring, resulting in the formation of carbonaceous material of which at least a portion adheres to inside walls of a conduit confining said carrier fluid near said point of confluence, thus protecting said walls from excessive abrasion, and thereafter allowing said fluid stream and said solids stream to gradually diffuse one into the other during flow to said second point.

3. In an apparatus for conveying particulate solids by means of suspension in a flowing fluid, comprising a first conduit, a second conduit meeting and communicating with said first conduit at a juncture, the improvement which comprises a substantially elbow-shaped extension of said second conduit extending into said first conduit and being concentric therewith, said apparatus having means for causing a stream of particulate solids to be introduced into said second conduit and to flow into and from said elbow-shaped extension, and also having means for causing a fluid to be introduced into one end of said first conduit and pass said juncture toward the other end of said first conduit, said elbow-shaped extension being adapted to direct the flow of said particulate solids substantially parallel to the flow of said fluid, and having a generally bullet-shaped baffle appended thereto with its apex toward said one end of said first conduit.

4. The apparatus of claim 3 wherein there is at least one conduit tangential to and communicating with said first conduit near said juncture.

5. An apparatus of claim 3 wherein said first conduit is enlarged in diameter over a substantial portion thereof, which portion includes the point of juncture of said first and second conduits.

6. The apparatus of claim 3 wherein a second baffle is disposed in said first conduit between said one end and said juncture, said baffle being effective to impart rotational motion to said fluid introduced into said first conduit.

7. In a process which comprises passing a confined fluid stream of carrier fluid from a first point to a second point and introducing thereinto concentrically a confined stream of particulate solids into confluence with said fluid stream at a point intermediate said first and second points, the method which comprises providing at the point of confluence and surrounding said point of confluence an annular zone of said fluid stream, said annular zone extending from said point of confluence towards said first point a substantial distance and having an internal radius gradually decreasing in the direction of said first point to the end of said annular zone at which point said radius is substantially zero, introducing said stream of particulate solids substantially concentrically into said annular zone, and thereafter allowing said fluid stream and said solids stream to gradually diffuse one into the other during flow to said second point.

8. The method of claim 7 wherein at least one secondary stream of fluid is introduced tangentially to said fluid stream of carrier fluid near said point of confluence, thus aiding the maintaining of said annular zone a substantial time and distance downstream.

9. A method of claim 7 wherein a plurality of streams of secondary fluid are introduced tangentially to said flowing stream of carrier fluid near said point of confluence, each of said plurality of streams being introduced at spaced intervals along the line of flow of said flowing stream of carrier fluid, the flow rate of each of said plurality of streams being adjusted individually in order to aid in obtaining a smooth confluence of said flowing stream of carrier fluid and said stream of particulate solids and to aid in minimizing migration of particulate solids to the periphery of said flowing stream of carrier fluid.

10. A process of claim 7 wherein said confined fluid stream of carrier fluid is enlarged in a cross-sectional area over a substantial portion of the length of said stream, which portion includes said point of confluence, whereby the velocity of the flow of said annular portion of said confined fluid stream in the direction of mass flow is lowered so that it more closely approaches the velocity of flow of said stream of particulate solids than if said enlargement were not provided.

References Cited in the file of this patent

UNITED STATES PATENTS

| | | |
|---|---|---|
| 676,239 | Labadie | June 11, 1901 |
| 1,994,511 | Gary | Mar. 19, 1935 |
| 2,374,518 | Wolk | Apr. 24, 1945 |
| 2,586,705 | Palmer | Feb. 19, 1952 |
| 2,695,265 | Degnen | Nov. 23, 1954 |
| 2,786,801 | McKinley et al. | Mar. 26, 1957 |

FOREIGN PATENTS

| | | |
|---|---|---|
| 141,903 | Great Britain | Apr. 29, 1920 |
| 736,207 | Great Britain | Sept. 7, 1955 |